United States Patent
Zhang et al.

(10) Patent No.: US 9,696,762 B2
(45) Date of Patent: Jul. 4, 2017

(54) UNLOCKING METHOD AND ELECTRONIC APPARATUS

(71) Applicants: Beijing Lenovo Software Ltd., Haidian District, Beijing (CN); Lenovo (Beijing) Co., Ltd., Haidian District, Beijing (CN)

(72) Inventors: Qiang Zhang, Beijing (CN); Yintian Liu, Beijing (CN)

(73) Assignees: BEIJING LENOVO SOFTWARE LTD., Haidian District, Beijing (CN); LENOVO (BEIJING) CO., LTD., Haidian District, Beijing (CN)

( * ) Notice: Subject to any disclaimer, the term of this patent is extended or adjusted under 35 U.S.C. 154(b) by 589 days.

(21) Appl. No.: 14/178,962

(22) Filed: Feb. 12, 2014

(65) Prior Publication Data

US 2014/0376181 A1 Dec. 25, 2014

(30) Foreign Application Priority Data

Jun. 19, 2013 (CN) .......................... 2013 1 0243121
Sep. 2, 2013 (CN) .......................... 2013 1 0392718

(51) Int. Cl.
*G06F 1/16* (2006.01)
*E05B 15/00* (2006.01)
(Continued)

(52) U.S. Cl.
CPC ........ *G06F 1/1679* (2013.01); *E05B 15/0073* (2013.01); *E05B 47/0006* (2013.01);
(Continued)

(58) Field of Classification Search
CPC .... E05B 15/0073; E05B 47/00; E05B 47/026; G06F 1/1679; G06F 1/1654; Y10T 70/7068
See application file for complete search history.

(56) References Cited

U.S. PATENT DOCUMENTS 5,953,196 A * 9/1999 Zimmermann .......... G05G 5/12
307/101
6,006,561 A * 12/1999 Hill ......................... E05B 47/00
70/276

(Continued)

FOREIGN PATENT DOCUMENTS

CN 101162434 4/2008

OTHER PUBLICATIONS

First Office Action dated Dec. 30, 2016 (13 pages including English translation) out of Chinese priority Application No. 201310392718.5.

(Continued)

*Primary Examiner* — Thomas Alunkal
(74) *Attorney, Agent, or Firm* — Brinks Gilson & Lione; G. Peter Nichols

(57) ABSTRACT

An unlocking method and an electronic apparatus are described. The unlocking method is applied in an electronic apparatus that includes a first body, a second body, and a capacitance detecting unit wherein the first body and the second body are locked by a locking mechanism. The method includes detecting whether there is an unlocking operation from a first user based on the capacitance detecting unit; generating an unlocking instruction in response to the unlocking operation when the unlocking operation is detected; and executing the unlocking instruction to control the locking mechanism to release lock, so as to make the first body able to be separated from the second body.

14 Claims, 4 Drawing Sheets

(51) Int. Cl.
*E05B 47/02* (2006.01)
*E05B 47/00* (2006.01)

(52) U.S. Cl.
CPC .......... *E05B 47/026* (2013.01); *G06F 1/1654* (2013.01); *Y10T 70/7062* (2015.04); *Y10T 70/7068* (2015.04)

(56) References Cited

U.S. PATENT DOCUMENTS

| | | | | |
|---|---|---|---|---|
| 7,636,237 | B2* | 12/2009 | Cheung | G06F 1/187 361/679.37 |
| 2003/0095690 | A1* | 5/2003 | Su | G06F 21/32 382/124 |
| 2006/0066438 | A1* | 3/2006 | Altounian | G06F 21/86 340/5.53 |
| 2012/0050975 | A1* | 3/2012 | Garelli | G06F 1/1615 361/679.27 |
| 2014/0049894 | A1* | 2/2014 | Rihn | G06F 1/1616 361/679.27 |

OTHER PUBLICATIONS

First Office Action dated Mar. 20, 2017 (18 pages including English translation) out of corresponding Chinese priority Application No. 201310243121.4.

* cited by examiner

UNLOCKING METHOD AND ELECTRONIC APPARATUS

BACKGROUND

This application claims priority to Chinese patent application No. 201310243121.4 filed on Jun. 19, 2013, and also to Chinese patent application No. 201310392718.5 filed on Sep. 2, 2013, the entire contents of which are incorporated herein by reference.

This application relates to the field of electronic apparatus, more specifically, to an unlocking method and an electronic apparatus.

A notebook computer has become more and more popular, generally, the notebook computer includes a first body having a display device and a second body having an input device and respective processing devices and, the first body and the second body are connected by a rotor shaft. And, the display device can receive and transmit instruction from and to the input device and the processing device so that the electronic apparatus operates normally by connecting the display device with the input device and the processing device by wiring in the rotor shaft.

Since the conventional notebook computer can't separate the first body from the second body to make the first body used independently, there generates a novel detachable notebook computer, which is characterized in that the first body can be separated from the second body so that the first body can be used independently. For example, the first body is used as a tablet computer.

The inventor of this application found at least the following technical problems in the prior art in the procedure of implementing the technical solution of the embodiments of this application:

In the detachable notebook computer in the prior art, there is a locking mechanism for locking the first body with the second body. And the locking mechanism has a connection relationship with an unlocking component in structure. When the first body needs to be unlocked from the second body, the unlocking procedure can be executed only by carrying out a mechanical type operation to the unlocking component, such as pressing the unlocking component or pushing the unlocking component. Therefore, there is a technical problem of sophisticated unlocking procedure.

SUMMARY

The embodiments of the present invention provide an unlocking method and an electronic apparatus for solving the technical problem of sophisticated unlocking procedure because that the unlocking procedure can be executed only by carrying out mechanical type operation to the unlocking component having the connection relationship with the locking mechanism in structure in the procedure in which the first body needs to be unlocked from the second body. And, it implements that the electronic apparatus can control the locking mechanism to release lock automatically when a touch control unlocking operation to a capacitance detecting unit of the user is detected, so that the unlocking procedure is simple.

This application provides the following technical solution by an aspect of the embodiments of this application:

An unlocking method applied in an electronic apparatus including a first body and a second body, wherein the first body and the second body are locked by a locking mechanism, and the electronic apparatus further includes a capacitance detecting unit, the method includes:

Detecting whether there is an unlocking operation from a first user based on the capacitance detecting unit;

Generating an unlocking instruction in response to the unlocking operation when the unlocking operation is detected;

Executing the unlocking instruction to control the locking mechanism to release lock, so as to make the first body be able to be separated from the second body.

Further, the generating an unlocking instruction in response to the unlocking operation specifically includes:

Obtaining a first password to be authenticated in response to the unlocking operation;

Deciding whether the first password to be authenticated matches a first standard password to obtain a first matching result;

Generating the unlocking instruction when the first matching result indicates that the match between the first password to be authenticated and the first standard password is successful.

Further, after the obtaining a first matching result, the method further includes:

Generating and outputting prompt information to prompt the first user to carry out the unlocking operation anew when the first matching result indicates that the match between the first password to be authenticated and the first standard password is failed.

Further, when the capacitance detecting unit includes at least one capacitance detecting point, the obtaining a first password to be authenticated in response to the unlocking operation is specifically:

Obtaining a first fingerprint to be authenticated in response to a first touch control unlocking operation carried out by the first user to the at least one capacitance detecting point.

Further, when the capacitance detecting unit includes M capacitance detecting points and M is an integer greater than or equal to 2, the obtaining a first password to be authenticated in response to the unlocking operation is specifically:

Obtaining a first pattern to be authenticated in response to a second touch control unlocking operation carried out by the first user to the M capacitance detecting points with a first rule.

Further, after generating the unlocking instruction, the method further includes:

Generating and sending an information synchronizing instruction to the second body to make the second body be able to send input information obtained to the first body by executing the information synchronizing instruction.

Further, when there is a timing unit in the electronic apparatus, after the controlling the locking mechanism to release lock, the method further includes:

Deciding whether first body is in a connected status or a disconnected status with the second body;

Detecting whether a first counting time value of the timing unit is equal to a preset counting time value when the first body is in the connected status with the second body;

Generating a locking instruction when the first counting time value is equal to the preset counting time value;

Executing the lock instruction to control the locking mechanism to lock again.

Further, when the locking mechanism includes a variable magnetic piece and an attracting piece which is capable of being absorbed to engage the variable magnetic piece, the executing the unlocking instruction to control the locking mechanism to release lock is specifically:

Executing the unlocking instruction to control the variable magnetic piece to change magnetism, so that the variable magnetic piece is no longer absorbed to engage the attracting piece so that the locking mechanism releases lock to make the first body be able to be separated from the second body.

This application provides the following technical solution by another aspect of the embodiments of this application:

An electronic apparatus including:

A first body;

A second body;

A locking mechanism by which the first body and the second body are locked;

A capacitance detecting unit for detecting whether there is an unlocking operation from a first user and generating an unlocking instruction in response to the unlocking operation when the unlocking operation is detected;

Wherein, the electronic apparatus is able to control the locking mechanism to release lock so as to make the first body be able to be separated from the second body by executing the unlocking instruction.

Further, the capacitance detecting unit specifically includes:

A capacitance detecting subunit for obtaining a first password to be authenticated in response to the unlocking operation;

A deciding subunit for deciding whether the first password to be authenticated matches a first standard password to obtain a first matching result;

A first instruction generating subunit for generating the unlocking instruction when the first matching result indicates that the match between the first password to be authenticated and the first standard password is successful.

Further, the capacitance detecting unit further includes:

A prompting subunit for generating and outputting prompt information to prompt the first user to carry out the unlocking operation anew when the first matching result indicates that the match between the first password to be authenticated and the first standard password is failed.

Further, when the capacitance detecting unit includes at least one capacitance detecting point, the capacitance detecting subunit is specifically for obtaining a first fingerprint to be authenticated in response to a first touch control unlocking operation carried out by the first user to the at least one capacitance detecting point.

Further, when the capacitance detecting unit includes M capacitance detecting points and M is an integer greater than or equal to 2, the capacitance detecting subunit is specifically for obtaining a first pattern to be authenticated in response to a second touch control unlocking operation carried out by the first user to the M capacitance detecting points with a first rule.

Further, the electronic apparatus further includes:

An information synchronizing unit for generating and sending an information synchronizing instruction to the second body to make the second body be able to send input information obtained to the first body by executing the information synchronizing instruction so that the first body can process the input information.

Further, the electronic apparatus further includes:

A timing unit;

A deciding unit for deciding whether the first body is in a connected status or a disconnected status with the second body;

A time detecting unit for detecting whether a first counting time value of the timing unit is equal to a preset counting time value when the first body is in the connected status with the second body;

A second instruction generating unit for generating a locking instruction when the first counting time value is equal to the preset counting time value;

Wherein, the electronic apparatus is able to control the locking mechanism to lock again by executing the locking instruction.

Further, when the locking mechanism includes a variable magnetic piece and an attracting piece which is able to be absorbed to engage the variable magnetic piece, the electronic apparatus executes the unlocking instruction to control the variable magnetic piece to change magnetism, so that the variable magnetic piece is no longer absorbed to engage the attracting piece, so that the locking mechanism releases lock to make the first body be able to be separated from the second body.

One or more technical solutions provided by the embodiments of this application at least have the following technical effects or advantages:

In the embodiments of the present invention, when the capacitance detecting unit detects the unlocking operation from the first user, the unlocking instruction is generated in response to the unlocking operation, and the locking mechanism is controlled to release lock by executing the unlocking instruction, so as to make the first body be able to be separated from the second body. It solves the technical problem of sophisticated unlocking procedure because that the unlocking procedure can be executed only by carrying out mechanical type operation to the unlocking component having the connection relationship with the locking mechanism in structure in the procedure in which the first body needs to be unlocked from the second body. And it implements a technical effect that the electronic apparatus is able to control the locking mechanism to release lock automatically based on the unlocking instruction, so that the unlocking procedure is simple.

Also, by obtaining the first password to be authenticated in response to the unlocking operation and generating the unlocking instruction only when the match between the first password to be authenticated and the first standard password is successful, it implements that the first body can be unlocked from the second body only when the unlocking operation is correct so that the first body can be separated from the second body, thus it prevents users other than the first user from carrying out the unlocking operation of the electronic apparatus at will and ensures security of the first user using the electronic apparatus.

Further, after the first body releases lock with the second body, in a preset counting time, if the first body does not separate from the second body, a locking instruction is generated when the first body is still in the connected status with the second body. The electronic apparatus can lock the locking mechanism again by executing the locking instruction, to prevent the first body from being taken by other user since the first user does not take out the first body after unlocking correctly, so as to further ensure security of the first user using the electronic apparatus;

Also, after generating the unlocking instruction, an information synchronizing instruction is generated and sent to the second body. The second body sends the input information to the first body by executing the information synchronizing instruction. This avoids loss of the input information caused by that there is still input operation of the second body but the first body fails to receive it in the procedure of the first body releasing lock with the second body, and ensures information synchronization of the first body and the second body.

DETAILED DESCRIPTION

Figure 1:
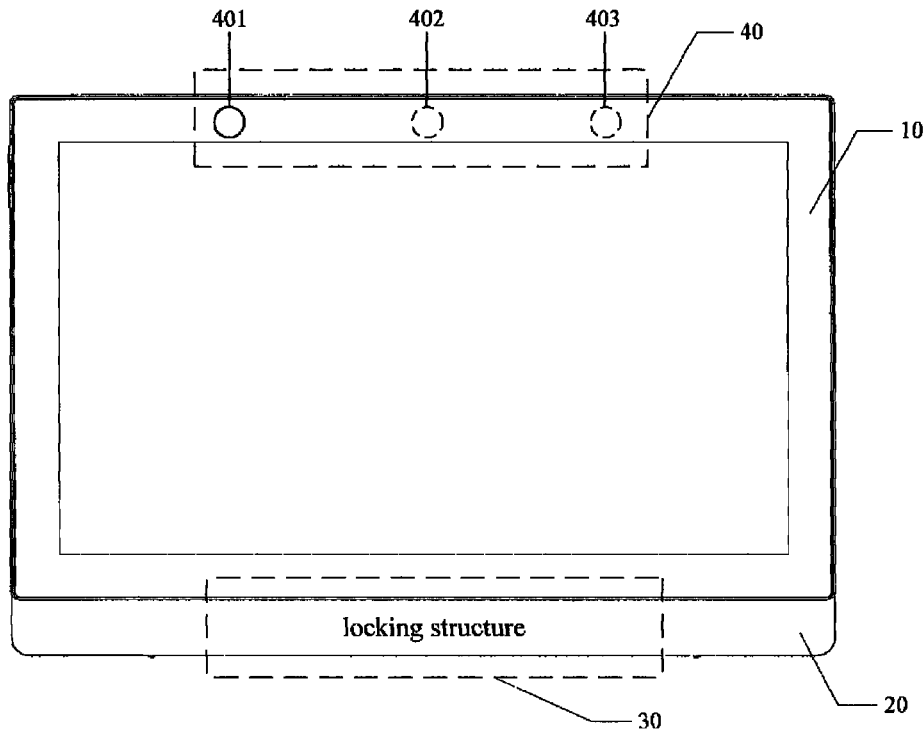
FIG. 1 is a schematic diagram of structure of the electronic apparatus of a first embodiment of the present invention.

The respective preferable embodiments of the present invention are described with reference to the accompanying drawings hereinafter. The description with reference to the accompanying drawings is provided hereinafter to help to understand the exemplified embodiment of the present invention defined by the claims or equivalents. It comprises various kinds of specific details helping understanding, and they are only regarded as schematic. Therefore, those skilled in the art would recognize that the embodiments described here can be made various kinds of alternations and modifications without departing from the range and spirit of the present invention. Further, in order to make the specification clearer and briefer, the detailed description on the well-known function and structure in the art would be omitted.

The first embodiment of the present invention provides an unlocking method and an electronic apparatus for solving the technical problem of sophisticated unlocking procedure because the unlocking procedure can be executed only by carrying out mechanical type operation to the unlocking component having the connection relationship with the locking mechanism in structure in the procedure in which the first body needs to be unlocked from the second body. And, it implements that the electronic apparatus can control the locking mechanism to release lock automatically when a touch control unlocking operation to a capacitance detecting unit of the user is detected, so that the unlocking procedure is simple.

The technical solution in the embodiments of the present invention has a general concept as follows for solving the above problem:

In the electronic apparatus including a first body and a second body, the first body and the second body are locked by a locking mechanism. A capacitance detecting unit is provided in the electronic apparatus. And, whether there is an unlocking operation from a first user is detected based on the capacitance detecting unit and an unlocking instruction is generated in response to the unlocking operation when the unlocking operation is detected. And, the locking mechanism is controlled to release lock by executing the unlocking instruction, so as to make the first body be able to be separated from the second body. It solves the technical problem of sophisticated unlocking procedure because the unlocking procedure can be executed only by carrying out mechanical type operation to the unlocking component having the connection relationship with the locking mechanism in structure in the procedure in which the first body needs to be unlocked from the second body. And, it implements that the electronic apparatus can control the locking mechanism to release lock automatically when a touch control unlocking operation to a capacitance detecting unit of the user is detected, so that the unlocking procedure is simple.

For understanding the above-described technical solution better, the above-described technical solution is explained in detail in combination with the accompanying drawings of the specification and the specific implementation mode.

The first embodiment of this application provides an unlocking method applied in an electronic apparatus including a first body 10 and a second body 20. The structural diagram of the electronic apparatus under a first view angle is as shown in FIG. 1. The second body 20 in FIG. 1 is a sectional view of the second body 20 under the first view angle, here, the first body 10 and the second body 20 are locked by a locking mechanism 30. The first body 10 and the second body 20 can operate under a locked status, and also, the first body 10 can be separated from the second body 20 so as to operate independently from the second body 20. For example, the first body 10 is a tablet computer and the second body 20 is an entity keyboard. Further, the first body 10 may only include a display screen, and the second body 20 includes an input unit and a processing unit. In a status that the first body 10 is unlocked with the second body 20, instructions are received and transmitted in wireless manner so that the first body 10 and the second body 20 operate normally.

Here, the electronic apparatus further includes a capacitance detecting unit 40. The capacitance detecting unit 40 may only include a capacitance detecting point 401, and may include M capacitance detecting points, where M is an integer larger than 1. The first embodiment of this application describes the unlocking method in detail by taking that the capacitance detecting unit 40 includes a first capacitance detecting point 401 and the capacitance detecting unit 40 includes three capacitance detecting points of the first capacitance detecting point 401, a second capacitance detecting point 402 and a third capacitance detecting point 403 as example. Those skilled in the art can set more than 3 capacitance detecting points accordingly, and this application does not make any restriction to the number of the capacitance detecting points.

Figure 2:
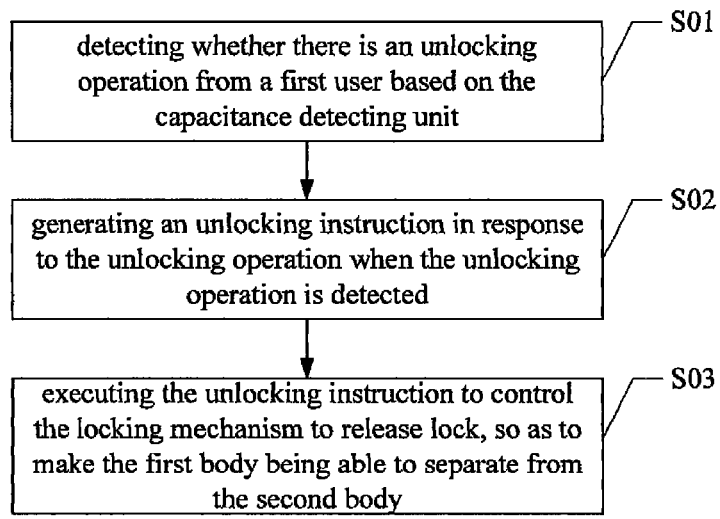
FIG. 2 is a flow chart of the operation of the unlocking method of the first embodiment of the present invention.

In the first embodiment of this application, as shown in FIG. 2, the method include steps of:

S01: detecting whether there is an unlocking operation from a first user based on the capacitance detecting unit.

In the specific implementation procedure, when the capacitance detecting unit 40 only includes the first capacitance detecting point 401, whether there is the unlocking operation from the first user is decided by detecting the first capacitance detecting point 401. In particular, whether the capacitance value at the first capacitance detecting point 401 changes is detected, and if the capacitance value changes, it represents that there is a touch control operation, that is, there is the unlocking operation from the first user. When the capacitance detecting unit 40 includes the first capacitance detecting point 401, the second capacitance detecting point 402 and the third capacitance detecting point 403, whether there are touch control operations to the three capacitance detecting points is decided by detecting whether the capacitance values at the above-described three capacitance detecting points change, in turn, whether there is the unlocking operation from the first user can be decided.

After completing step S01, the first embodiment of this application executes S02: generating an unlocking instruction in response to the unlocking operation when the unlocking operation is detected.

Figure 3:
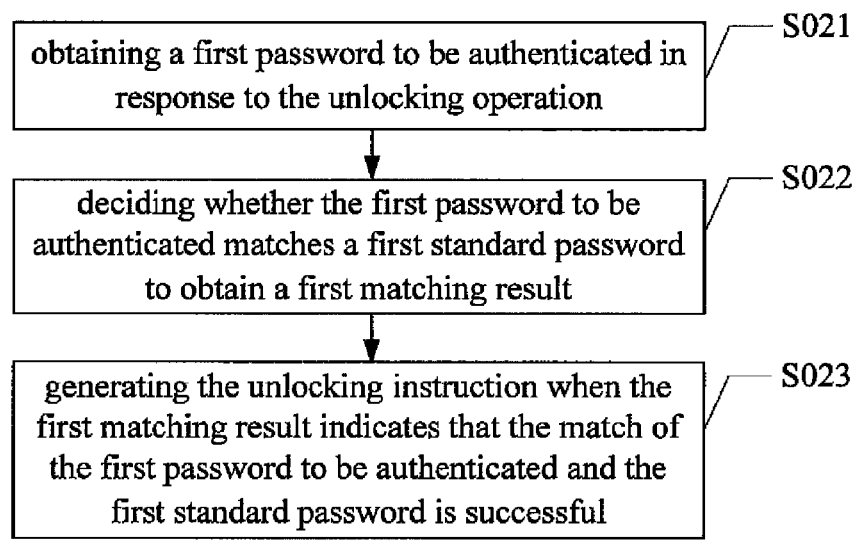
FIG. 3 is a flow chart of operation of step S02 in the first embodiment of the present invention.

In the first embodiment of this application, as shown in FIG. 3, the generating an unlocking instruction in response to the unlocking operation specifically includes:

S021: obtaining the first password to be authenticated in response to the unlocking operation.

Here, when the capacitance detecting unit 40 includes at least one capacitance detecting point, for example, the capacitance detecting unit 40 only includes a first capacitance detecting point 401, or the capacitance detecting unit includes the first capacitance detecting point 401, the second capacitance detecting point 402 and the third capacitance detecting point 403, the obtaining a first password to be authenticated in response to the unlocking operation is specifically: obtaining a first fingerprint to be authenticated in response to a first touch control unlocking operation carried out by the first user to the first capacitance detecting point 401; or obtaining the first fingerprint to be authenticated in response to the first touch control unlocking operation carried out by the first user to the first capacitance detecting point 401, the second capacitance detecting point 401 and the third capacitance detecting point 403.

Here, when the capacitance detecting unit 40 includes M capacitance detecting points, where M is an integer greater than or equal to 2, for example, the capacitance detecting unit 40 includes the first capacitance detecting point 401, the second capacitance detecting point 402 and the third capacitance detecting point 403, the obtaining a first password to be authenticated in response to unlocking operation is specifically:

Obtaining a first pattern to be authenticated in response to a second touch control unlocking operation executed by the first user to the M capacitance detecting points with a first rule. In particular, since the touch control unlocking operations of the first user to the three capacitance detecting points are different, for example, the first user touches the first capacitance detecting point 401 and the second capacitance detecting point 402 in this order, or the first user touches the second capacitance detecting point 402 and the first capacitance detecting point 401 in this order, or the first user touches the first capacitance detecting point 401, the second capacitance detecting point 402 and the third capacitance detecting point 403 in this order, the first patterns to be authenticated obtained by the electronic apparatus are different. It needs to explain that the pattern to be authenticated has directionality. In procedure of carrying out the touch control unlocking operation to the first capacitance detecting point 401 and the second capacitance detecting point 402, the first pattern to be authenticated is obtained by touching the first capacitance detecting point 401 and then touching the second capacitance detecting point 402, and a second pattern to be authenticated obtained by touching the second capacitance detecting point 402 and then touching the first capacitance detecting point 401 is a different pattern from the first pattern to be authenticated.

After completing S021, the first embodiment of this application executes S022: deciding whether the first password to be authenticated matches the first standard password to obtain a first matching result.

After completing S022, the first embodiment of this application executes S023: generating the unlocking instruction when the first matching result indicates that the match between the first password to be authenticated and the first standard password is successful.

Further, after the obtaining a first matching result, the method further includes:

Generating and outputting prompt information to prompt the first user to carry out the unlocking operation anew when the first matching result indicates that the match between the first password to be authenticated and the first standard password is failed.

In the specific implementation procedure, the first standard password may be a password preset in the electronic apparatus for authenticating identity of the user, and may be a password set by the user himself. After the match between the first password to be authenticated and the first standard password is successful, the unlocking instruction is generated, so as to implement the first body releasing lock with the second body, and ensure security of the first user using the electronic apparatus.

It needs to explain that, at the same time of obtaining the first pattern to be authenticated in response to the touch control unlocking operation, a first fingerprint to be authenticated of the first user executing the touch control unlocking operation may be obtained. Further, after the match between the first pattern to be authenticated and the first standard pattern is successful, the first fingerprint to be authenticated and the first standard fingerprint may be matched. After the match between the first fingerprint to be authenticated and the first standard fingerprint is also successful, the unlocking instruction is generated. Therefore, when the capacitance detecting unit includes at least one capacitance detecting point, an authentication procedure of the fingerprint can be executed, and when the capacitance detecting unit includes at least two capacitance detecting points, authentication procedure of the pattern can be executed. Further, those skilled in the art can combine other password setting manner in the prior art to the unlocking method described in this application, and this application does not make any specific restriction.

After completing S02, the first embodiment of this application executes S03: executing the unlocking instruction to control the locking mechanism to release lock so as to make the first body be able to be separated from the second body.

Preferably, in the first embodiment of this application, after the generating the unlocking instruction, the method further includes:

Generating and sending an information synchronizing instruction to the second body to make the second body be able to send input information obtained to the first body by executing the information synchronizing instruction.

In the specific implementation procedure, after obtaining the unlocking instruction, the electronic apparatus knows that the first body 10 needs to release lock with the second body 20. In order to avoid loss of input information obtained through the second body 20 of the first body 10, the electronic apparatus can generate and send the information synchronizing instruction to the second body 20 by the first body 10, and can generate the information synchronizing instruction by the second body 20 itself. Whether the first body 10 or the second body 20 generates the information synchronizing instruction, after the second body 20 obtains the information synchronizing instruction, if the first body 10 and the second body 20 are in a disconnected status, the input information is sent to the first body 10 in a wireless transmission manner, so as to implement synchronization of the information.

Preferably, in the embodiment of this application, when there is a timing unit in the electronic apparatus, after the controlling the locking mechanism to release lock, the method further includes:

Deciding whether first body is in a connected status or a disconnected status with the second body;

Detecting whether a first counting time value of the timing unit is equal to a preset counting time value when the first body is in the connected status with the second body;

Generating a locking instruction when the first counting time value is equal to the preset counting time value;

Executing the lock instruction to control the locking mechanism to lock again.

In the first embodiment of this application, when the locking mechanism 30 includes a variable magnetic piece and an attracting piece which is capable of being absorbed to engage the variable magnetic piece, the executing the unlocking instruction to control the locking mechanism to release lock is specifically:

Executing the unlocking instruction to control the variable magnetic piece to change magnetism, so that the variable magnetic piece is no longer absorbed to engage the attracting piece so that the locking mechanism releases lock to make the first body be able to be separated from the second body.

In the first embodiment of this application, only the locking mechanism 30 in FIG. 1 is taken as example to describe the specific implementation mode of the steps in the method of this application, and those skilled in the art may select other locking mechanism 30 including the variable magnetic piece and the attracting piece, and this application does not make any specific restriction to the specific structure of the locking mechanism 30.

The unlocking procedure is described in detail in combination with the specific structure of the locking mechanism 30 as follows.

Figure 4:
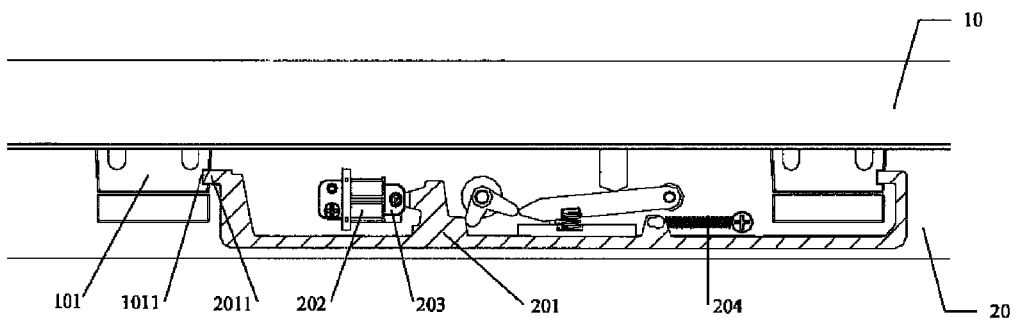
FIG. 4 is an enlarged view of the locking mechanism in the first embodiment of the present invention.

As shown in FIG. 4 of enlarged view of the locking mechanism 30, the locking mechanism 30 includes a first connecting member 101 positioned in the first body 10, a first locating hole 1011 is provided on the first connecting member 101. The locking mechanism 30 further includes a lock bar 201 provided in the second body 20, a variable magnetic piece 202, an attracting piece 203 and an elastic piece 204. Wherein, a first locating pin 2011 is provided on the lock bar 201, the lock bar 201 is connected with the attracting piece 203, and the variable magnetic piece 202 is fixed at the housing of the second body 20. When the variable magnetic piece 202 is absorbed to engage the attracting piece 203, the first locating pin 2011 engages to join the first locating hole 1011, so that the first body 10 and the second body 20 are locked by the locking mechanism 30. At this time, the elastic piece 204 is in an extended status.

When the variable magnetic piece 202 is a resistant electromagnet, since the physical characteristic thereof is a status of loss of magnetism as power on and a magnetic status as power off. In the embodiment of this application, after obtaining the unlocking instruction, the unlocking instruction is executed to supply power to the variable magnetic piece 202. Since the variable magnetic piece 202 loses magnetism after power on and is no longer absorbed to engage the attracting piece 203, the lock bar 201 is pulled in the action of the force of reverse drawing of the elastic piece 204 restoring original length, so that the first locating pin 2011 no longer engages to join the first locating hole 1011. Thus, the first body 10 release lock with the second body 20 and the first body 10 is able to separate from the second body 20.

Then, when the first body 10 and the second body 20 are in an unlocked status, if the first user does not operate the first body 10 so that the first body 10 still connects with the second body 20, the electronic apparatus automatically generates and executes the locking instruction to control the locking mechanism 30 to lock again when the timing unit in the electronic apparatus reaches a preset counting time. For example, after the variable magnetic piece 202 loses magnetism, a status of power-on of the variable magnetic piece 202 is kept for 5 seconds, and if there is no operation for separating the first body 10 from the second body 20 within the 5 seconds, a locking instruction is generated to control not to supply power to the variable magnetic piece 202 any longer, so that the variable magnetic piece 202 is absorbed to engage the attracting piece 203 again, and thus, the first body 10 is locked with the second body 20 again.

It needs to explain that, in the first embodiment of this application, when the display unit included in the first body 10 is specifically a touch control display unit, the capacitance detecting unit 40 can be a device different from the touch control display unit, or the function of the capacitance detecting unit 40 can be implemented by using the touch control display unit, that is, whether there is the unlocking operation from the first user is detected on the touch control display unit. In the first embodiment of this application, it does not make any specific restriction to the specific implementation mode of the capacitance detecting unit 40 and the position of the capacitance detecting point provided, those skilled in the art can make selection according to actual requirement.

Hereinafter, in order to make those skill in the art to which this application belongs to understand the method in the above embodiment more clearly and fully, the implementation procedure of the method is explained in combination with a concrete procedure of the usage of the user.

It is assumed that the first body 10 and the second body 20 included in the electronic apparatus have already in the locked status, and when the user A needs to separate the first body 10 from the second body 20, he takes the unlocking operation to the electronic apparatus firstly, the unlocking operation is an operation carried out by the user A to the capacitance detecting unit in the electronic apparatus. Wherein, the capacitance detecting unit may only include a first capacitance detecting point 401, and may include several capacitance detecting points. When the capacitance detecting unit only includes the first capacitance detecting point 401, the user A can touch the capacitance detecting point to execute the unlocking operation, and at the same time, the electronic apparatus can obtain information of fingerprint of the user A, and can use the information of fingerprint as the first password to be authenticated. When the capacitance detecting unit includes the first capacitance detecting point 401, the second capacitance detecting point 402 and the third capacitance detecting point 403, the user A can touch the above-described three capacitance detecting points in order to execute the unlocking operation, for example, touches the first capacitance detecting point 401, the second capacitance detecting point 402 and the third capacitance detecting point 403 in this order, or touches the second capacitance detecting point 402 and the first capacitance detecting point 401 in this order, or touches the first capacitance detecting point 401 and the second capacitance detecting point 402 in this order. And at the same time, the electronic apparatus can not only obtain information of pattern based on the touch control operation executed to the several capacitance detecting points and use the information of pattern as the first password to be authenticated, it can also obtain information of fingerprint of the user A and use it as a second password to be authenticated. Here, after the electronic apparatus obtains the password to be authenticated, the first password to be authenticated is matched with the standard password preset by the user, and if the match is successful, the unlocking instruction can be generated. Preferably, at the same time of generating the unlocking instruction, an information synchronizing instruction is further generated and sent to the second body 20, and the second body 20 can send input information to the first body 10 by executing the information synchronizing instruction. After generating the unlocking instruction, the electronic apparatus controls the locking mechanism for locking the first body 10 and the second body 20 to release lock by executing the unlocking instruction. After the locking mechanism releases lock, if the user A carries out pull-out operation to the first body 10, the first body 10 is separated from the second body 20, and thus the first body 10 and the second body 20 are in a disconnected status, and if there is not a pull-out operation of the user A, the first body 10 and the second body 20 are still in the connected status. After a preset counting time, if the user A has not carried out the pull-out operation to the first body 10 yet, the electronic apparatus generates the locking instruction, and the first body 10 is locked with the second body 20 again by executing the locking instruction.

Based on a same inventive concept, another aspect of the first embodiment of this application provides an electronic apparatus, as shown in FIG. 1, the electronic apparatus includes:

A first body 10;

A second body 20;

A locking mechanism 30 by which the first body 10 is locked with the second body 20;

A capacitance detecting unit 40 for detecting whether there is an unlocking operation from a first user and generating an unlocking instruction in response to the unlocking operation when the unlocking operation is detected;

Wherein, the electronic apparatus is able to control the locking mechanism 30 to release lock so as to make the first body 10 be able to be separated from the second body 20 by executing the unlocking instruction.

Further, the capacitance detecting unit 40 specifically includes:

A capacitance detecting subunit for obtaining a first password to be authenticated in response to the unlocking operation;

A deciding subunit for deciding whether the first password to be authenticated matches a first standard password to obtain a first matching result;

A first instruction generating subunit for generating the unlocking instruction when the first matching result indicates that the match between the first password to be authenticated and the first standard password is successful.

Further, the capacitance detecting unit 40 further includes:

A prompting subunit for generating and outputting prompt information to prompt the first user to carry out the unlocking operation anew when the first matching result indicates that the match between the first password to be authenticated and the first standard password is failed.

Further, when the capacitance detecting unit 40 includes at least one capacitance detecting point 401, the capacitance detecting subunit is specifically for obtaining a first fingerprint to be authenticated in response to a first touch control unlocking operation carried out by the first user to the at least one capacitance detecting point.

Further, when the capacitance detecting unit 40 includes M capacitance detecting points, where M is an integer greater than or equal to 2, the capacitance detecting subunit is specifically for obtaining a first pattern to be authenticated in response to a second touch control unlocking operation carried out by the first user to the M capacitance detecting points with a first rule.

Further, the electronic apparatus further includes:

An information synchronizing unit for generating and sending an information synchronizing instruction to the second body 20 to make the second body 20 able to send input information obtained to the first body 10 by executing the information synchronizing instruction so that the first body 10 can process the input information.

Further, the electronic apparatus further includes:

A timing unit;

A deciding unit for deciding whether the first body 10 is in a connected status or a disconnected status with the second body 20;

A time detecting unit for detecting whether a first counting time value of the timing unit is equal to a preset counting time value when the first body 10 is in the connected status with the second body 20;

A second instruction generating unit for generating a locking instruction when the first counting time value is equal to the preset counting time value;

Wherein, the electronic apparatus is able to control the locking mechanism to lock again by executing the locking instruction.

Further, when the locking mechanism 30 includes a variable magnetic piece 202 and an attracting piece 203 which is able to be absorbed to engage the variable magnetic piece, the electronic apparatus executes the unlocking instruction to control the variable magnetic piece 202 to change magnetism, so that the variable magnetic piece 202 is no longer absorbed to engage the attracting piece 203, so that the locking mechanism 30 releases lock to make the first body 10 be able to be separated from the second body 20.

Since the electronic apparatus described in the present embodiment is the electronic apparatus employed when the unlocking method of the first embodiment of this application is implemented, so those skilled in the art can understand the detailed implementation mode and various modification and variation of the first embodiment of this application based on the unlocking method of the first embodiment of this application, so the electronic apparatus is not described in detail here. The electronic apparatus employed by those skilled in the art implementing the method of the first embodiment of this application all fall into the scope sought for protection of this application.

One or more technical solutions provided in the first embodiment of this application at least have the following technical effects or advantages:

In the first embodiments of the present invention, when the capacitance detecting unit detects the unlocking operation from the first user, the unlocking instruction is generated in response to the unlocking operation, and the locking mechanism is controlled to release lock by executing the unlocking instruction, so as to make the first body be able to be separated from the second body. It solves the technical problem of sophisticated unlocking procedure because the unlocking procedure can be executed only by carrying out mechanical type operation to the unlocking component having the connection relationship with the locking mechanism in structure in the procedure in which the first body needs to be unlocked from the second body. And it implements a technical effect that the electronic apparatus is able to control the locking mechanism to release lock automatically based on the unlocking instruction, so that the unlocking procedure is simple.

Also, by obtaining the first password to be authenticated in response to the unlocking operation and generating the unlocking instruction only when the match between the first password to be authenticated and the first standard password is successful, it implements that the first body can be released lock from the second body only when the unlocking operation is correct so that the first body can be separated from the second body, thus it prevents users other than the first user from carrying out the unlocking operation of the electronic apparatus at will and ensures security of the first user using the electronic apparatus.

Further, after the first body releases lock with the second body, in a preset counting time, if the first body does not separate from the second body, a locking instruction is generated when the first body is still in the connected status with the second body. The electronic apparatus can lock the locking mechanism again by executing the locking instruction, to prevent the first body from being taken by other user since the first user does not take out the first body after unlocking correctly, so as to further ensure security of the first user using the electronic apparatus;

Also, after generating the unlocking instruction, the information synchronizing instruction is generated and sent to the second body, and the second body sends the input information to the first body by executing the information synchronizing instruction. This avoids loss of the input information caused by that there is still input operation of the second body but the first body fails to receive it in the procedure of the first body releasing lock with the second body, and ensures information synchronization of the first body and the second body.

As explained in the above, with the development of technology, more and more electronic apparatuses come into human's life, for example, a smart phone, a tablet computer, a notebook computer, a smart TV or the like, these electronic apparatus bring large convenience to human's life.

In addition to the above-described application of the detachable notebook computer, at present, by taking the tablet computer as example, in order to expand scene of application of the tablet computer and facilitate the user to use it, the user can connect the tablet computer with an expanding dock by a connecting piece, and this connecting piece is usually an engaging piece or a magnetic force piece. When the user wants to connect the tablet computer with the expanding dock, he only needs to connect the connecting piece on the tablet computer with the connecting piece on the expanding dock. When the user wants to separate the tablet computer from the expanding dock, he can make the connecting piece on the tablet computer to separate from the connecting piece on the expanding dock by toggling a switch or by disconnecting the connection on the tablet computer and the expanding dock forcedly.

However, the inventor of this application found that the above-described technology at least has the following technical problem in procedure of implementing the technical solution of the embodiments of the present invention:

Since the connecting piece on the tablet computer is separated from the connecting piece on the expanding dock according to operation of the user, that is, if the user is able to disconnect the connection between the electronic apparatus and the expanding dock by carrying out corresponding operation, when the electronic apparatus is reading data in the expanding dock, if the user carries out operation to disconnect the electronic apparatus and the expanding dock, there occurs case of loss of data, thus, there is a technical problem that reliability of the data communication between the electronic apparatus and the expanding dock is low since the electronic apparatus can be separated from the expanding dock.

Therefore, the second embodiment of the present invention further provides an unlocking method and an electronic apparatus for solving the technical problem that the reliability of the data communication between the electronic apparatus and the expanding dock is low since the electronic apparatus can be separated from the expanding dock in the prior art.

In a first aspect, the second embodiment of the present invention provides an unlocking method applied in an electronic apparatus by on specific implementation mode of the embodiment of this application. The electronic apparatus is able to physically connect to an expanding dock separable by a locking mechanism which has a locked status and an unlocked status. When the locking mechanism is in the locked status, the electronic apparatus keeps connection with the expanding dock; and when the locking mechanism is in the unlocked status, the electronic apparatus is able to be separated from the expanding dock. The method includes: obtaining a trigger instruction when the locking mechanism is in the locked status and the electronic apparatus carries out read-write operation of data to the expanding dock, wherein the instruction is an instruction representing that the electronic apparatus is to separate from the expanding dock; saving the data in response to the trigger instruction; and controlling the locking mechanism to be in the unlocked status.

Optionally, the saving the data in response to the trigger instruction specifically includes: generating a prompting interface to prompt the user whether to terminate the read-write operation in response to the trigger instruction; and saving the data if the read-write operation is to be terminated.

Optionally, the obtaining the trigger instruction specifically includes: detecting whether there is a first operation to a pop-up control piece; and generating the trigger instruction when there is the first operation to the pop-up control piece.

Optionally, the pop-up control piece is specifically a mechanical control piece provided on the electronic apparatus/the expanding dock; or the pop-up control piece is specifically an operational object on the display unit.

Optionally, the obtaining the trigger instruction specifically includes: detecting whether the relative position between the electronic apparatus and the expanding dock is a first relative position; and generating the trigger instruction when the relative position between the electronic apparatus and the expanding dock is the first relative position.

In a second aspect, the second embodiment of the present invention further provides an electronic apparatus which is able to physically connect to an expanding dock separable by a locking mechanism by another specific implementation mode of the embodiment of this application. Wherein, the locking mechanism has a locked status and an unlocked status, and when the locking mechanism is in the locked status, the electronic apparatus keeps connection with the expanding dock; and when the locking mechanism is in the unlocked status, the electronic apparatus is able to be separated from the expanding dock. The electronic apparatus includes: a housing; a memory provided in the housing for saving data of communication between the electronic apparatus and the expanding dock; a control chip provided in the housing and connected to the memory and for obtaining a trigger instruction when the locking mechanism is in the locked status and the electronic apparatus makes read-write operation of data to the expanding dock, wherein, the trigger instruction is an instruction representing that the electronic apparatus is to be separated from the expanding dock; the control chip is also for saving the data in response to the trigger instruction and controlling the locking mechanism to be in the unlocked status.

Optionally, the control chip specifically includes: an operation acquiring unit for obtaining the trigger instruction when the locking mechanism is in the locked status and the electronic apparatus makes the read-write operation of data to the expanding dock, wherein trigger instruction is an instruction representing that the electronic apparatus is to be separated from the expanding dock; and a control unit for saving the data in response to the trigger instruction and controlling the locking mechanism to be in the unlocked status.

Optionally, the control unit specifically includes: a prompt generating unit for generating a prompting interface to prompt the user whether to terminate the read-write operation in response to the trigger instruction; and a data storage unit for saving the data if the read-write operation is to be terminated.

Optionally, the operation acquiring unit is specifically for: detecting whether there is a first operation to a pop-up control piece; and generating the trigger instruction when there is the first operation to the pop-up control piece.

Optionally, the pop-up control piece is specifically a mechanical control piece provided on the electronic apparatus/the expanding dock; or the pop-up control piece is specifically an operational object on the display unit.

Optionally, the operation acquiring unit is specifically for: detecting whether the relative position between the electronic apparatus and the expanding dock is a first relative position; and generating the trigger instruction when the relative position between the electronic apparatus and the expanding dock is the first relative position The advantageous effects of the technical solution of the second embodiment of the present invention are as follows.

The second embodiment of the present invention provides an unlocking method applied in an electronic apparatus which is able to physically connect to an expanding dock separable by a locking mechanism having a locked status and an unlocked status. When the locking mechanism is in the locked status, the electronic apparatus keeps connection with the expanding dock; and when the locking mechanism is in the unlocked status, the electronic apparatus can separate from the expanding dock. Then, when the locking mechanism is in the locked status and the electronic apparatus makes read-write operation of data to the expanding dock, the electronic apparatus obtains a trigger instruction, here, the trigger instruction is an instruction representing that the electronic apparatus is to be separated from the expanding dock. And then, the electronic apparatus saves the data in response to the trigger instruction, and control the locking mechanism to be in the unlocked status after saving the data, that is, the electronic apparatus can be disconnected from the expanding dock, so that the case of loss of data would not occur. Therefore, it effectively solves the technical problem that the reliability of the data communication between the electronic apparatus and the expanding dock is low because that the electronic apparatus is separated from the expanding dock in the prior art, and increases reliability of the data communication between the electronic apparatus and the expanding dock so as to improve user's experience.

The second embodiment of this application solves the technical problem that the reliability of the data communication between the electronic apparatus and the expanding dock is low since the electronic apparatus can be separated from the expanding dock in the prior art by providing an unlocking method and an electronic apparatus.

The overall concept of the technical solution of the second embodiment of this application for solving the above-described problem that the reliability of the data communication between the electronic apparatus and the expanding dock is low because that the electronic apparatus is separated from the expanding dock is as follows:

Since the electronic apparatus is able to physically connect to the expanding dock separable by the locking mechanism having the locked status and the unlocked status, and when one locking mechanism is in the locked status, the electronic apparatus keeps connection with the expanding dock; and when the locking mechanism is in the unlocked status, the electronic apparatus is able to be separated from the expanding dock. Then, when the locking mechanism is in the locked status and the electronic apparatus makes read-write operation of data to the expanding dock, the electronic apparatus obtains a trigger instruction, here, the trigger instruction is an instruction represents that the electronic apparatus is to be separated from the expanding dock. And then, the electronic apparatus saves the data in response to the trigger instruction, and control the locking mechanism to be in the unlocked status after saving the data, that is, the electronic apparatus can be disconnected from the expanding dock, so that the case of loss of data would not occur. Therefore, it effectively solves the technical problem that the reliability of the data communication between the electronic apparatus and the expanding dock is low because that the electronic apparatus is separated from the expanding dock in the prior art, and increases reliability of the data communication between the electronic apparatus and the expanding dock so as to improve user's experience.

Hereinafter, the technical solution of the second embodiment of the present invention is further described in detail through the accompanying drawings and the specific embodiment, it should be understood that the second embodiment of the present invention and the specific characteristic in the embodiment is a detailed explanation of the technical solution of the present invention, but not a restriction to the technical solution of the present invention, and the second embodiment of the present invention and the technical features in the embodiment can be combined with each other without conflict.

Figure 5:
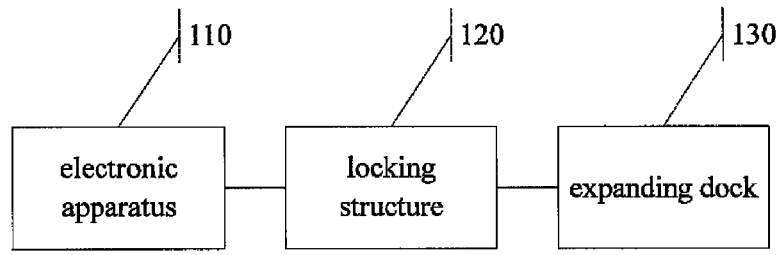
FIG. 5 is a schematic diagram of the connection relationship between the electronic apparatus and the locking mechanism and the expanding dock in a second embodiment of the invention.

In a first aspect, the second embodiment of the present invention provides an unlocking method applied in an electronic apparatus such as a tablet computer, a smart phone or a multimedia player or the like by one specific implementation mode of the embodiment of this application. As shown in FIG. 5, an electronic apparatus 110 is able to physically connect to an expanding dock 130 separable by a locking mechanism 120. The locking mechanism 120 has two kinds of status of a locked status and an unlocked status, and when the locking mechanism 120 is in the locked status, the electronic apparatus 110 keeps connection with the expanding dock 130; and when the locking mechanism 120 is in the unlocked status, the electronic apparatus 110 is able to be separated from the expanding dock 130. That is, when the locking mechanism 120 is in the locked status, the user can't separate the electronic apparatus 110 from the expanding dock 130 without damaging the electronic apparatus 110 and the expanding dock 130, and when the locking mechanism 120 is in the unlocked status, the user can separate the electronic apparatus 110 from the expanding dock 130 easily with a small force.

In this embodiment, the locking mechanism 120 may be electromagnets provided on the electronic apparatus 110 and the expanding dock 130 respectively. For example, a first magnetic force piece of polarity "S" is provided on one end of the electronic apparatus 110, and a second magnetic force piece of polarity "N" is provided in an accommodating slot of the expanding dock 130. When the locking mechanism 120 is in the locked status, the first magnetic force piece and the second magnetic force piece absorb each other and have a relatively strong magnetic field, so that the two magnetic force pieces are not separated by external force easily. When the locking mechanism 120 is in the unlocked status, the polarity of the first magnetic force piece or the second magnetic force piece is changed, or any one of the two magnetic force pieces are demagnetized. At this time, the first magnetic force piece and the second magnetic force piece don't absorb each another and even exclude each other, so that the two magnetic force pieces are separated by the external force easily.

Of course, in procedure of practical usage, the locking mechanism 120 may be a snap and a hook, those skilled in the art can configure by themselves and this application does not make any specific restriction.

Figure 6:
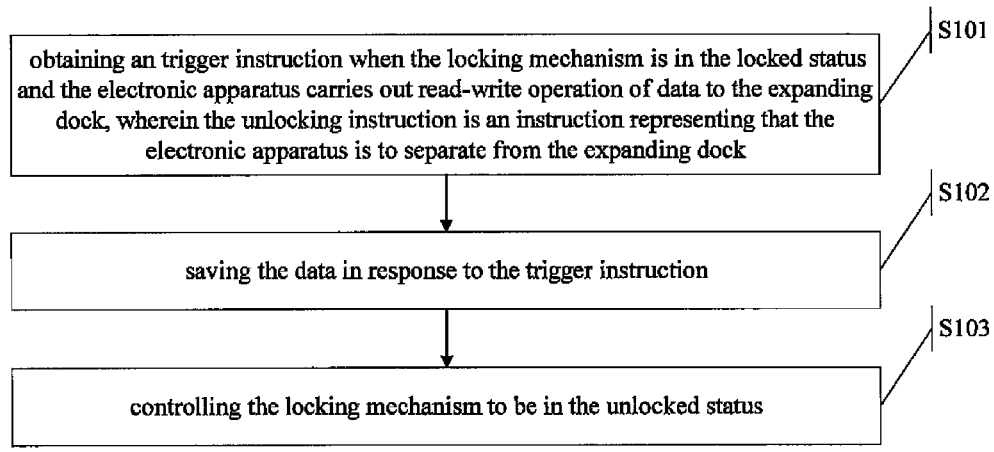
FIG. 6 is a flow chart of the unlocking method of the second embodiment of the present invention.

As shown in FIG. 6, the method includes:

S101: obtaining a trigger instruction when the locking mechanism is in the locked status and the electronic apparatus makes read-write operation of data to the expanding dock, here, the trigger instruction is an instruction representing that the electronic apparatus is to be separated from the expanding dock;

S102: saving the data in response to the trigger instruction;

S103: controlling the locking mechanism to be in the unlocked status.

Hereinafter, the above-described scheme is explained by taking the electronic apparatus 110 being a tablet computer as example.

With reference to FIG. 5 and FIG. 6, for example, when the electronic apparatus 110, i.e., the tablet computer is connected to the expanding dock 130 and the locking mechanism 120 is in the locked status, the user reads and writes the stored data in the expanding dock 130 by a data interface between the electronic apparatus 110 and the expanding dock 130 such as a USB interface or a HDMI interface. At this time, if the user wants to separate the electronic apparatus 110 from the expanding dock 130, the user can change the status of the locking mechanism 120 by operating a pop-up control piece. At this time, step S101 may be: detecting whether there is a first operation to the pop-up control piece and generating the trigger instruction when there is the first operation to the pop-up control piece. That is, whether the user carries out a manual operation to the electronic apparatus 110 or the expanding dock 130 is detected to separate the electronic apparatus 110 from the expanding dock 130.

In the specific implementation procedure, the pop-up control piece may be but not limit to the following two kinds of cases.

In the first case, the pop-up control piece is specifically a mechanical control piece provided on the electronic apparatus 110 or the expanding dock 130, for example, a toggle switch, a button switch or the like, then, whether the user toggles the toggle switch or presses the button switch is detected. If the above-described operation is detected, it decides that there is the first operation of the user to the pop-up control piece, that is, the electronic apparatus 110 is to separate from the expanding dock 130, and the trigger instruction is generated at this time.

In the second case, the pop-up control piece is specifically an operational object on a display unit of the electronic apparatus 110; for example, a popped-up icon or a popped-up application or the like, then, whether the user touches or clicks the popped-up icon or whether the user starts the popped-up application is detected. If the user clicks or touches the popped-up icon or the user starts the popped-up application, it is decided that there is the first operation of the user to the pop-up control piece, that is, the electronic apparatus 110 is to separate from the expanding dock 130, and the trigger instruction is generated at this time.

Of course, the pop-up control piece is not limited to the above-described two kinds of implement modes only, it may be other kinds, those skilled in the art con configure by themselves according to practical situation, and this application does not make any specific restriction.

In another specific implementation mode, step S101 may also be: detecting whether a relative position between the electronic apparatus and the expanding dock is a first relative position, and generating the trigger instruction when the relative position between the electronic apparatus and the expanding dock is the first relative position. That is, whether the electronic apparatus 110 is to be separated from the expanding dock 130 is determined by detecting the relative position between the electronic apparatus 110 and the expanding dock 130. When the electronic apparatus 110 and the expanding dock 130 being in the first relative position is detected, it is decided that the electronic apparatus 110 is to be separated from the expanding dock 130, and the trigger instruction is generated at this time. For example, an angle between the electronic apparatus 110 and the expanding dock 130 is detected, and the trigger instruction is generated when the angle is a preset angle such as 120°, 180° or the like. In practical applications, the relative position between the electronic apparatus 110 and the expanding dock 130 can be detected by other means such as an acceleration sensor, an angular sensor or a gyroscope or the like, this application does not make any specific restriction.

Next, after obtaining the above-described trigger instruction by step S101, step S102 is executed, that is, the data is saved in response to the trigger instruction. That is, in response to the above-described trigger instruction, all data currently read by the electronic apparatus 110 from the expanding dock 130 is saved locally, or the file being edited by the current user is saved.

In another embodiment, in order to prevent incorrect operation, step S102 can be: generating a prompting interface to prompt the user whether to terminate the read-write operation in response to the trigger instruction and saving the data if it is to terminate the read-write operation.

Figure 7:
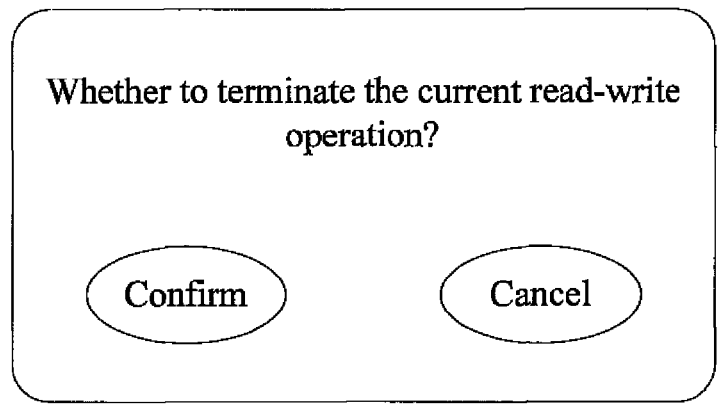
FIG. 7 is a schematic diagram of a prompting interface in the second embodiment of the present invention.

In particular, a prompt interface is generated in response to the above-described trigger instruction to prompt the user whether to terminate the read-write operation, and the prompting interface may be as shown in FIG. 7, and then, the electronic apparatus 110 saves the data when the user clicks a "confirm" button.

After saving the data, step S103 of controlling the locking mechanism to be in the unlocked status is executed. At this time, the user can separate the electronic apparatus 110 from the expanding dock 130 easily.

It is known from the above description, since the electronic apparatus is able to physically connect to the expanding dock separable by the locking mechanism having the locked status and the unlocked status, and when the locking mechanism is in the locked status, the electronic apparatus keeps connection with the expanding dock; and when the locking mechanism is in the unlocked status, the electronic apparatus is able to be separated from the expanding dock, then, when the locking mechanism is in the locked status and the electronic apparatus makes read-write operation of data to the expanding dock, the electronic apparatus obtains a trigger instruction, here, the trigger instruction is an instruction represents that the electronic apparatus is to be separated from the expanding dock. And then, the electronic apparatus saves the data in response to the trigger instruction, and control the locking mechanism to be in the unlocked status after saving the data, that is, the electronic apparatus can be disconnected from the expanding dock, so that the case of loss of data would not occur. Therefore, it effectively solves the technical problem that the reliability of the data communication between the electronic apparatus and the expanding dock is low because that the electronic apparatus is separated from the expanding dock in the prior art, and increases reliability of the data communication between the electronic apparatus and the expanding dock so as to improve user's experience.

Figure 8:
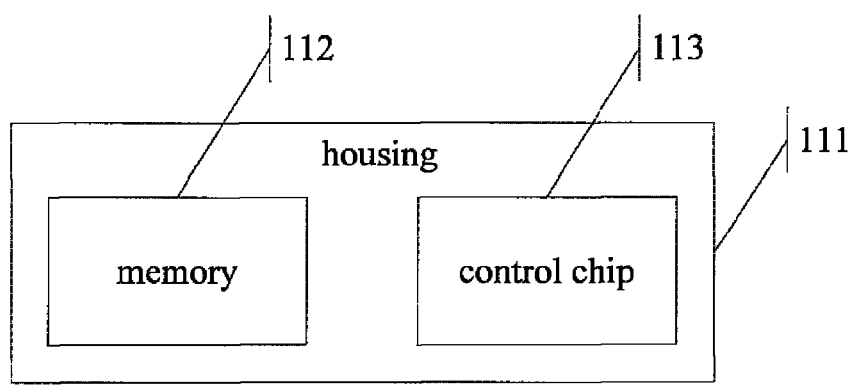
FIG. 8 is a schematic diagram of structure of the electronic apparatus of the second embodiment of the present invention.

In a second aspect, based on the save inventive concept, the second embodiment of the present invention provides an electronic apparatus such as a tablet computer, a smart phone or a multimedia player or the like by another specific implementation mode of the second embodiment of the present invention. As shown in FIG. 5, the electronic apparatus 110 is able to physically connect to the expanding dock 130 separable by the locking mechanism 120. Wherein, the locking mechanism 120 has two kinds of status of a locked status and an unlocked status, and when the locking mechanism 120 is in the locked status, the electronic apparatus 110 keeps connection with the expanding dock 130; and when the locking mechanism 120 is in the unlocked status, the electronic apparatus 110 is able to be separated from the expanding dock 130. As shown in FIG. 8, the electronic apparatus 110 includes: a housing 111; a memory 112 provided in the housing 111 for saving data of communication between the electronic apparatus 110 and the expanding dock 130; a control chip 113 provided in the housing 111 and connected to the memory 112 and for obtaining a trigger instruction when the locking mechanism 120 is in the locked status and the electronic apparatus 110 makes read-write operation of data to the expanding dock 130, wherein, the trigger instruction is an instruction representing that the electronic apparatus 110 is to be separated from the expanding dock 130; the control chip 113 is also for saving the data in response to the trigger instruction and controlling the locking mechanism 120 to be in the unlocked status.

In this embodiment, the locking mechanism 120 may be electromagnets provided on the electronic apparatus 110 and the expanding dock 130 respectively, for example, a first magnetic force piece of polarity "S" is provided on one end of the electronic apparatus 110, and a second magnetic force piece of polarity "N" is provided in an accommodating slot of the expanding dock 130. When the locking mechanism 120 is in the locked status, the first magnetic force piece and the second magnetic force piece absorb each other and have a relatively strong magnetic field, so that the two magnetic force pieces are not separated by the external force easily. And when the locking mechanism 120 is in the unlocked status, polarity of the first magnetic force piece or the second magnetic force piece is changed, or any one of the two magnetic force pieces is demagnetized. At this time, the first magnetic force piece and the second magnetic force piece don't absorb each another and even exclude each other, so that the two magnetic force pieces are separated by the external force easily.

Of course, in procedure of practical usage, the locking mechanism 120 may be a snap and a hook, those skilled in the art can configure by themselves and this application does not make any specific restriction.

Further, the control chip 113 specifically includes: an operation acquiring unit for obtaining the trigger instruction when the locking mechanism 120 is in the locked status and the electronic apparatus 110 makes the read-write operation of data to the expanding dock 130, wherein the trigger instruction is an instruction representing that the electronic apparatus is to separate from the expanding dock; and a control unit for saving the data in response to the trigger instruction and controlling the locking mechanism 120 to be in the unlocked status.

Further, the control unit specifically includes: a prompt generating unit for generating a prompting interface as shown in FIG. 7 to prompt the user whether to terminate the read-write operation in response to the trigger instruction; and a data storage unit for saving the data if the read-write operation is to be terminated.

Further, the operation acquiring unit is specifically for: detecting whether there is a first operation to the pop-up control piece; and generating the trigger instruction when there is the first operation to the pop-up control piece.

Optionally, the pop-up control piece is specifically a mechanical control piece provided on the electronic apparatus 110/the expanding dock 130; or the pop-up control piece is specifically an operational object on the display unit.

Further, the operation acquiring unit is specifically for: detecting whether relative position between the electronic apparatus 110 and the expanding dock 130 is a first relative position; and generating the trigger instruction when the relative position between the electronic apparatus 110 and the expanding dock 130 is the first relative position.

The various modified manners and specific example in the above-mentioned unlocking method of the second embodiment can be applied in the electronic apparatus in the likewise, and those skilled in the art can understand the implementing method of the electronic apparatus by the detailed description of the above unlocking method, thus there no longer describes for the simplicity of specification.

The technical solution in the above second embodiment of the present application at least has the following technical effects or advantages:

The second embodiment of the present invention provides an unlocking method applied in an electronic apparatus which is able to physically connect to an expanding dock separable by a locking mechanism. The locking mechanism has a locked status and an unlocked status, and when the locking mechanism is in the locked status, the electronic apparatus keeps connection with the expanding dock; and when the locking mechanism is in the unlocked status, the electronic apparatus is able to separate from the expanding dock. Then, when the locking mechanism is in the locked status and the electronic apparatus makes read-write operation of data to the expanding dock, the electronic apparatus obtains a trigger instruction, here, the trigger instruction is an instruction represents that the electronic apparatus is to separate from the expanding dock. And then, the electronic apparatus saves the data in response to the trigger instruction, and control the locking mechanism to be in the unlocked status after saving the data, that is, the electronic apparatus can be disconnected from the expanding dock, so that the case of loss of data would not occur. Therefore, it effectively solves the technical problem that the reliability of the data communication between the electronic apparatus and the expanding dock is low because that the electronic apparatus is separated from the expanding dock in the prior art, and increases reliability of the data communication between the electronic apparatus and the expanding dock so as to improve user's experience.

Here, those skilled in the art can understand, the principle of the unlocking method and the electronic apparatus provided by the second embodiment of the present invention is similar to the principle of the information synchronizing instruction in the unlocking method and the electronic apparatus of the first embodiment of the present invention, both of them are used to avoid a situation of loss of data in case that the electronic apparatus unlocks. However, the unlocking method and the electronic apparatus of the first embodiment of the present invention is to adopt electronic type unlocking mode in order to avoid the problem of sophisticated procedure of mechanical type unlocking operation. The unlocking method and the electronic apparatus of the second embodiment of the present invention can be applied in both of the mechanical type unlocking mode and the electronic type unlocking mode in like manner. And, in case the unlocking method and the electronic apparatus according to the second embodiment of the present invention are combined with the unlocking method and the electronic apparatus according to the first embodiment of the present invention, the technical solutions of the unlocking method and the electronic apparatus of the second embodiment of the present invention are substantially similar to step and unit for the information synchronization in the unlocking method and the electronic apparatus of the first embodiment of the present invention.

Therefore, in case the unlocking method and the electronic apparatus according to the first embodiment of the present invention are applied individually, the unlocking method and the electronic apparatus according to the embodiments of the present invention are configured as follows.

(1) An unlocking method applied in an electronic apparatus including a first body and a second body, wherein the first body and the second body are locked by a locking mechanism, and the electronic apparatus further includes a capacitance detecting unit, the method includes:

Detecting whether there is an unlocking operation from a first user based on the capacitance detecting unit;

Generating an unlocking instruction in response to the unlocking operation when the unlocking operation is detected;

Executing the unlocking instruction to control the locking mechanism to release lock, so as to make the first body be able to be separated from the second body.

(2) The unlocking method according to the above (1), wherein generating an unlocking instruction in response to the unlocking operation specifically includes:

Obtaining a first password to be authenticated in response to the unlocking operation;

Deciding whether the first password to be authenticated matches a first standard password to obtain a first matching result;

Generating the unlocking instruction when the first matching result indicates that the match of the first password to be authenticated and the first standard password is successful.

(3) The unlocking method according to the above (2), wherein after obtaining the first matching result, the method further includes:

Generating and outputting prompt information to prompt the first user to carry out the unlocking operation anew when the first matching result indicates that the match between the first password to be authenticated and the first standard password is failed.

(4) The unlocking method according to the above (2), wherein when the capacitance detecting unit includes at least one capacitance detecting point, obtaining the first password to be authenticated in response to the unlocking operation is specifically:

Obtaining a first fingerprint to be authenticated in response to a first touch control unlocking operation executing by the first user to the at least one capacitance detecting point.

(5) The unlocking method according to the above (2), wherein when the capacitance detecting unit includes M capacitance detecting points, where M is an integer greater than or equal to 2, obtaining the first password to be authenticated in response to the unlocking operation is specifically:

Obtaining a first pattern to be authenticated in response to a second touch control unlocking operation executing by the first user to the M capacitance detecting points with a first rule.

(6) The unlocking method according to the above (1), wherein after generating the unlocking instruction, the method further includes:

Generating and sending an information synchronizing instruction to the second body to make the second body be able to send input information obtained to the first body by executing the information synchronizing instruction.

(7) The unlocking method according to the above (1), wherein when there is a timing unit in the electronic apparatus, after the locking mechanism releases lock, the method further includes:

Deciding whether first body is in a connected status or a disconnected status with the second body;

Detecting whether a first counting time value of the timing unit is equal to a preset counting time value when the first body is in the connected status with the second body;

Generating a locking instruction when the first counting time value is equal to the preset counting time value;

Executing the lock instruction to control the locking mechanism to lock again.

(8) The unlocking method according to the above (1), wherein when the locking mechanism includes a variable magnetic piece and an attracting piece which is capable of being absorbed to engage the variable magnetic piece, executing the unlocking instruction to control the locking mechanism to release lock is specifically:

Executing the unlocking instruction to control the variable magnetic piece to change magnetism, so that the variable magnetic piece is no longer absorbed to engage the attracting piece so that the locking mechanism releases lock to make the first body be able to be separated from the second body.

(9) An electronic apparatus including:
A first body;
A second body;
A locking mechanism by which the first body and the second body are locked;
A capacitance detecting unit for detecting whether there is an unlocking operation from a first user and generating an unlocking instruction in response to the unlocking operation when the unlocking operation is detected;

Wherein, the electronic apparatus is able to control the locking mechanism to release lock so as to make the first body be able to be separated from the second body by executing the unlocking instruction.

(10) The electronic apparatus according to the above (9), wherein, the capacitance detecting unit specifically includes:

A capacitance detecting subunit for obtaining a first password to be authenticated in response to the unlocking operation;

A deciding subunit for deciding whether the first password to be authenticated matches a first standard password to obtain a first matching result;

A first instruction generating subunit for generating the unlocking instruction when the first matching result indicates that the match between the first password to be authenticated and the first standard password is successful.

(11) The electronic apparatus according to the above (10), wherein the capacitance detecting unit further includes:

A prompting subunit for generating and outputting prompt information to prompt the first user to carry out the unlocking operation anew when the first matching result indicates that the match between the first password to be authenticated and the first standard password is failed.

(12) The electronic apparatus according to the above (10), wherein when the capacitance detecting unit includes at least one capacitance detecting point, the capacitance detecting subunit is specifically for obtaining a first fingerprint to be authenticated in response to a first touch control unlocking operation carried out by the first user to the at least one capacitance detecting point.

(13) The electronic apparatus according to the above (10), wherein when the capacitance detecting unit includes M capacitance detecting points and M is an integer greater than or equal to 2, the capacitance detecting subunit is specifically for obtaining a first pattern to be authenticated in response to a second touch control unlocking operation carried out by the first user to the M capacitance detecting points with a first rule.

(14) The electronic apparatus according to the above (9), wherein the electronic apparatus further includes:

An information synchronizing unit for generating and sending an information synchronizing instruction to the second body to make the second body be able to send input information obtained to the first body by executing the information synchronizing instruction so that the first body can process the input information.

(15) The electronic apparatus according to the above (9), wherein the electronic apparatus further includes:

A timing unit;

A deciding unit for deciding whether the first body is in a connected status or a disconnected status with the second body;

A time detecting unit for detecting whether a first counting time value of the timing unit is equal to a preset counting time value when the first body is in the connected status with the second body;

A second instruction generating unit for generating a locking instruction when the first counting time value is equal to the preset counting time value;

Wherein, the electronic apparatus is able to control the locking mechanism to lock again by executing the locking instruction.

(16) The electronic apparatus according to the above (9), wherein when the locking mechanism includes variable magnetic piece and an attracting piece which is able to be absorbed to engage the variable magnetic piece, the electronic apparatus executes the unlocking instruction to control the variable magnetic piece to change magnetism, so that the variable magnetic piece and the attracting piece are no longer absorbed to engage, so that the locking mechanism releases lock so as to make the first body be able to be separated from the second body.

When the unlocking method and the electronic apparatus according to the first embodiment of the present invention and the unlocking method and the electronic apparatus according to a second embodiment of the present invention are used in combination with each other, the unlocking method and the electronic apparatus according to the embodiments of the present invention can be configured as follows.

(17) The unlocking method according to the above (6), wherein the first body is a main body of the electronic apparatus, and the second body is an expanding dock for the electronic apparatus, and The locking mechanism has a locked status and an unlocked status, and when the locking mechanism is in the locked status, the main body of the electronic apparatus keeps connection with the expanding dock; and when the locking mechanism is in the unlocked status, the main body of the electronic apparatus is able to be separated from the expanding dock;

Wherein generating the unlocking instruction includes:

Obtaining the unlocking instruction when the locking mechanism is in the locked status and the main body of the electronic apparatus carries out read-write operation of data to the expanding dock, wherein the unlocking instruction is an instruction representing that the main body of the electronic apparatus is to separate from the expanding dock;

Saving the data in response to the unlocking instruction.

(18) The unlocking method according to the above (17), wherein saving the data in response to the trigger instruction specifically includes:

Generating a prompt interface in response to the trigger instruction to prompt the user whether to terminate the read-write operation;

Saving the data if the user is to terminate the read-write operation.

(19) The unlocking method according to the above (17), wherein obtaining the unlocking instruction specifically includes:

Detecting whether there is a first operation to a pop-up control piece;

Generating the unlocking instruction when there is the first operation to the pop-up control piece.

(20) The unlocking method according to the above (19), wherein the pop-up control piece is specifically a mechanical control piece provided on the main body of the electronic apparatus/the expanding dock; or the pop-up control piece is specifically an operational object on the display unit.

(21) The unlocking method according to the above (17), wherein obtaining the unlocking instruction specifically includes:

Detecting whether a relative position between the main body of the electronic apparatus and the expanding dock is a first relative position;

Generating the unlocking instruction when the relative position between the main body of the electronic apparatus and the expanding dock is the first relative position.

(22) The electronic apparatus according to the above (14), wherein the first body is a main body of the electronic apparatus, and the second body is an expanding dock for the electronic apparatus, The locking mechanism has a locked status and an unlocked status, and when the locking mechanism is in the locked status, the main body of the electronic apparatus keeps connection with the expanding dock; and when the locking mechanism is in the unlocked status, the main body of the electronic apparatus is able to separate from the expanding dock, the electronic apparatus further includes:

A memory provided in the first body or the second body and for saving data of communication between the main body of the electronic apparatus and the expanding dock;

A control chip provided in the first body or the second body and connected with the memory and for obtaining an unlocking instruction when the locking mechanism is in the locked status and the main body of the electronic apparatus carries out read-write operation of data to the expanding dock, wherein the unlocking instruction is an instruction representing that the main body of the electronic apparatus is to separate from the expanding dock, the control chip is also for saving the data in response to the unlocking instruction.

(23) The electronic apparatus according to the above (22), wherein the control chip specifically includes:

An operation acquiring unit for obtaining the unlocking instruction when the locking mechanism is in the locked status and the main body of the electronic apparatus carries out read-write operation of data to the expanding dock, wherein the unlocking instruction is an instruction representing that the main body of the electronic apparatus is to separate from the expanding dock;

A control unit for saving the data in response to the unlocking instruction;

Wherein, the control unit is further for controlling the locking mechanism to release lock.

(24) The electronic apparatus according to the above (23), wherein the control unit specifically includes:

A prompt generating unit for generating a prompt interface in response to the unlocking instruction to prompt the user whether to terminate the read-write operation;

A data storage unit for saving the data if the user is to terminate the read-write operation.

(25) The electronic apparatus according to the above (23), wherein the operation acquiring unit is specifically for: detecting whether there is a first operation to a pop-up control piece; and generating the unlocking instruction when there is the first operation to the pop-up control piece.

(26) The electronic apparatus according to the above (25), wherein the pop-up control piece is specifically a mechanical control piece provided on the main body of the electronic apparatus/the expanding dock; or the pop-up control piece is specifically an operational object on the display unit.

(27) The electronic apparatus according to the above (23), wherein the operation acquiring unit is specifically for: detect a relative position between the main body of the electronic apparatus and the expanding dock is a first relative position; and generating the unlocking instruction when the relative position between the main body of the electronic apparatus and the expanding dock is the first relative position.

In case that the unlocking method and the electronic apparatus according to the second embodiment of the present invention are applied individually, the unlocking method and the electronic apparatus according to the embodiments of the present invention are configured as follows.

(28) An unlocking method applied in an electronic apparatus which is able to physically connect to an expanding dock separable by a locking mechanism having a locked status and an unlocked status, the electronic apparatus keeping connection with the expanding dock when the locking mechanism is in the locked status, and the electronic apparatus being able to separate from the expanding dock when the locking mechanism is in the unlocked status, the unlocking method includes:

Obtaining a trigger instruction when the locking mechanism is in the locked status and the main body of the electronic apparatus carries out read-write operation of data to the expanding dock, wherein the trigger instruction is an instruction representing that the electronic apparatus is to separate from the expanding dock;

Saving the data in response to the trigger instruction.

Controlling the locking mechanism to be in the unlocked status.

(29) The unlocking method according to the above (28), wherein saving the data in response to the trigger instruction specifically includes:

Generating a prompt interface in response to the trigger instruction to prompt the user whether to terminate the read-write operation;

Saving the data if the user is to terminate the read-write operation.

(30) The unlocking method according to the above (28), wherein obtaining the trigger instruction specifically includes:

Detecting whether there is a first operation to a pop-up control piece;

Generating the trigger instruction when there is the first operation to the pop-up control piece.

(31) The unlocking method according to the above (30), wherein the pop-up control piece is specifically a mechanical control piece provided on the electronic apparatus/the expanding dock; or the pop-up control piece is specifically an operational object on a display unit.

(32) The unlocking method according to the above (28), wherein obtaining the trigger instruction specifically includes:

Detecting whether a relative position between the electronic apparatus and the expanding dock is a first relative position;

Generating the trigger instruction when the relative position between the electronic apparatus and the expanding dock is the first relative position.

(33) An electronic apparatus which is able to physically connect to an expanding dock separable by a locking mechanism, wherein the locking mechanism has a locked status and an unlocked status, the electronic apparatus keeps connection with the expanding dock when the locking mechanism is in the locked status, and the electronic apparatus is able to separate from the expanding dock when the locking mechanism is in the unlocked status, the electronic apparatus includes:

A housing;

A memory provided in the housing and for saving data of communication between the electronic apparatus and the expanding dock;

A control chip provided in the housing and connected with the memory and for obtaining an trigger instruction when the locking mechanism is in the locked status and the electronic apparatus carries out read-write operation of data to the expanding dock, wherein the unlocking instruction is an instruction representing that the electronic apparatus is to separate from the expanding dock, the control chip is also for saving the data in response to the unlocking instruction; and controlling the locking mechanism to be in the unlocked status.

(34) The electronic apparatus according to the above (33), wherein the control chip specifically includes:

An operation acquiring unit for obtaining the trigger instruction when the locking mechanism is in the locked status and the main body of the electronic apparatus carries out read-write operation of data to the expanding dock, wherein the trigger instruction is an instruction representing that the main body of the electronic apparatus is to separate from the expanding dock;

A control unit for saving the data in response to the trigger instruction and for controlling the locking mechanism to be in the unlocked status.

(35) The electronic apparatus according to the above (34), wherein the control unit specifically includes:

A prompt generating unit for generating a prompt interface in response to the trigger instruction to prompt the user whether to terminate the read-write operation;

A data storage unit for saving the data if the user is to terminate the read-write operation.

(36) The electronic apparatus according to the above (34), wherein the operation acquiring unit is specifically for: detecting whether there is a first operation to a pop-up control piece; and generating the trigger instruction when there is the first operation to the pop-up control piece.

(37) The electronic apparatus according to the above (36), wherein the pop-up control piece is specifically a mechanical control piece provided on the electronic apparatus/the expanding dock; or the pop-up control piece is specifically an operational object on the display unit.

(38) The electronic apparatus according to the above (34), wherein the operation acquiring unit is specifically for: detecting a relative position between the electronic apparatus and the expanding dock is a first relative position; and generating the trigger instruction when the relative position between the electronic apparatus and the expanding dock is the first relative position.

Further, the above (17) to (27) are described by taking the respective technical features of the technical solutions of the unlocking method and the electronic apparatus according to the second embodiment of the present invention incorporating the technical solutions of the unlocking method and the electronic apparatus according to the first embodiment of the present invention as example. And those skilled in the art can understand that, the respective technical features of the technical solutions of the unlocking method and the electronic apparatus according to the first embodiment of the present invention can be incorporated into the technical solutions of the unlocking method and the electronic apparatus according to the second embodiment of the present invention. In this case, the unlocking method and the electronic apparatus according to the embodiment of the present invention can be configured as follows.

(39) The unlocking method according to any one of the above (28) to (32), wherein the electronic apparatus further includes a capacitance detecting unit, Obtaining the trigger instruction specifically includes:

Detecting whether there is an unlocking operation from a first user based on the capacitance detecting unit;

Generating the trigger instruction in response to the unlocking operation when the unlocking operation is detected;

(40) The unlocking method according to the above (39), wherein generating the trigger instruction in response to the unlocking operation specifically includes:

Obtaining a first password to be authenticated in response to the unlocking operation;

Deciding whether the first password to be authenticated matches a first standard password to obtain a first matching result;

Generating the trigger instruction when the first matching result indicates that the match of the first password to be authenticated and the first standard password is successful.

(41) The unlocking method according to the above (40), wherein after obtaining the first matching result, the method further includes:

Generating and outputting prompt information to prompt the first user to carry out the unlocking operation anew when the first matching result indicates that the match between the first password to be authenticated and the first standard password is failed.

(42) The unlocking method according to the above (40), wherein when the capacitance detecting unit includes at least one capacitance detecting point, obtaining the first password to be authenticated in response to the unlocking operation is specifically:

Obtaining a first fingerprint to be authenticated in response to a first touch control unlocking operation executing by the first user to the at least one capacitance detecting point.

(43) The unlocking method according to the above (40), wherein when the capacitance detecting unit includes M capacitance detecting points, where M is an integer greater than or equal to 40, obtaining the first password to be authenticated in response to the unlocking operation is specifically:

Obtaining a first pattern to be authenticated in response to a second touch control unlocking operation executing by the first user to the M capacitance detecting points with a first rule.

(44) The unlocking method according to the above (39), wherein after saving the data in response to the trigger instruction, the method further includes:

Generating and sending an information synchronizing instruction to the expanding dock to make the expanding dock be able to send input information obtained to the electronic apparatus by executing the information synchronizing instruction.

(45) The unlocking method according to the above (39), wherein when there is a timing unit in the electronic apparatus, after controlling the locking mechanism to be in the unlocked status, the method further includes:

Deciding whether the electronic apparatus is in a connected status or a disconnected status with the expanding dock;

Detecting whether a first counting time value of the timing unit is equal to a preset counting time value when the electronic apparatus is in the connected status with the expanding dock;

Generating a locking instruction when the first counting time value is equal to the preset counting time;

Executing the lock instruction to control the locking mechanism to lock again.

(46) The unlocking method according to the above (39), wherein when the locking mechanism includes a variable magnetic piece and an attracting piece which is capable of being absorbed to engage the variable magnetic piece, controlling the locking mechanism to be in the unlocked status is specifically:

Executing the trigger instruction to control the variable magnetic piece to change magnetism, so that the variable magnetic piece is no longer absorbed to engage the attracting piece so that the locking mechanism releases lock to make the electronic apparatus be able to be separated from the expanding dock.

(47) The electronic apparatus according to any one of the above (33) to (38), wherein, the electronic apparatus further includes:

A capacitance detecting unit for detecting whether there is an unlocking operation from a first user, The control chip obtaining the trigger instruction is specifically: obtaining the trigger instruction in response to the unlocking operation when the unlocking operation is detected.

(48) The electronic apparatus according to the above (47), wherein, the capacitance detecting unit specifically includes:

A capacitance detecting subunit for obtaining a first password to be authenticated in response to the unlocking operation;

A deciding subunit for deciding whether the first password to be authenticated matches a first standard password to obtain a first matching result;

The control chip further includes:

A first instruction generating subunit for obtaining the trigger instruction when the first matching result indicates that the match between the first password to be authenticated and the first standard password is successful.

(49) The electronic apparatus according to the above (48), wherein, the capacitance detecting unit further includes:

A prompting subunit for generating and outputting prompt information to prompt the first user to carry out the unlocking operation anew when the first matching result indicates that the match between the first password to be authenticated and the first standard password is failed.

(50) The electronic apparatus according to the above (48), wherein when the capacitance detecting unit includes at least one capacitance detecting point, the capacitance detecting subunit is specifically for obtaining a first fingerprint to be authenticated in response to a first touch control unlocking operation carried out by the first user to the at least one capacitance detecting point.

(51) The electronic apparatus according to the above (48), wherein when the capacitance detecting unit includes M capacitance detecting points, where M is an integer greater than or equal to 2, the capacitance detecting subunit is specifically for obtaining a first pattern to be authenticated in response to a second touch control unlocking operation carried out by the first user to the M capacitance detecting points with a first rule.

(52) The electronic apparatus according to the above (47), wherein the control chip further includes:

An information synchronizing unit for generating and sending an information synchronizing instruction to the expanding dock to make the expanding dock be able to send input information obtained to the electronic apparatus by executing the information synchronizing instruction so that the electronic apparatus can process the input information.

(53) The electronic apparatus according to the above (47), wherein the control chip further includes:

A timing unit;

A deciding unit for deciding whether the electronic apparatus is in a connected status or a disconnected status with the expanding dock;

A time detecting unit for detecting whether a first counting time value of the timing unit is equal to a preset counting time value when the electronic apparatus is in the connected status with the expanding dock;

A second instruction generating unit for generating a locking instruction when the first counting time value is equal to the preset counting time value;

Wherein, the electronic apparatus is able to control the locking mechanism to lock again by executing the locking instruction.

(54) The electronic apparatus according to the above (47), wherein when the locking mechanism includes a variable magnetic piece and an attracting piece which is able to absorb to engage the variable magnetic piece, the control chip executes the trigger instruction to control the variable magnetic piece to change magnetism, so that the variable magnetic piece and the attracting piece are no longer absorbed to engage, so that the locking mechanism releases lock so as to make the electronic apparatus be able to be separated from the expanding dock.

Here, those skilled in the art can understand, other than the above manners, the unlocking method and the electronic apparatus according to the first embodiment of the present invention as well as the unlocking method and the electronic apparatus according to the second embodiment of the present invention can be combined with each other in other manners, the embodiments of the present invention does not intend to make any restriction thereto.

Each embodiment of the present invention is described in detail above. However, those skilled in the art should understand, these embodiments can be made various modifications, combination or sub-combination without departing from the principle and spirit of the present invention, and such modification should fall into the range of the present invention.

Those skilled in the art should understand that, the embodiments of the present invention can be provided as a method, a system or a computer program product. Therefore, the present invention can adopt forms of a full hardware embodiment, a full software embodiment, or an embodiment combining software and hardware aspects. And, the present invention can adopt forms of computer program product implemented on one or more computer usable storage mediums (including, but not limited to magnetic disk storage, CD-ROM, optical memory or the like) including computer usable program codes.

The present invention is described by referring to flow charts and/or block diagrams of method, apparatus (system) and computer program product according to the embodiments of the present invention. It should be understood that each flow and/or block in the flow charts and/or block diagrams and the combination of the flow and/or block in the flow charts and/or block diagrams can be implemented by computer program instruction. These computer program instructions can be provided to processors of a general purpose computer, a dedicated computer, an embedded processor or other programmable data processing apparatus to generate a machine, so that a device for implementing functions specified in one or more flows of the flow charts and/or one or more blocks of the block diagrams is generated by the instructions executed by the processor of the computer or other programmable data processing apparatus.

These computer program instructions can also be stored in computer readable storage which is able to direct the computer or other programmable data processing apparatus to operate in specific manners, so that the instructions stored in the computer readable storage generate manufactured articles including commander equipment, which implements functions specified by one or more flows in the flow charts and/or one or more blocks in the block diagrams.

These computer program instructions can be loaded to computer or other programmable data processing apparatus, so that a series of operation steps are executed on the computer or other programmable apparatus to generate computer implemented process, so that the instructions executed on the computer or other programmable apparatus provide steps for implementing functions specified in one or more flows of the flow charts and/or one or more blocks of the block diagrams.

Further, it needs to note that, in the specification, terms "comprise", "include" and any other variations thereof intend to cover nonexclusive inclusion so that the procedure, the method, the product or the equipment including a series of elements not only includes these elements, but also include other elements which are not listed explicitly, or also include inherent elements of these procedure, method, product or equipment. In a case that there is no more limitation, the element defined by statement "including one . . . " does not exclude there is an additional same element in the procedure, method, article or apparatus including the element.

Finally, it should be noted that, the above-described series of processing does not only comprise processing executed chronologically in the order mentioned here, and also comprise processing executed in parallel or individually but not chronologically.

Though some embodiments of the present invention are shown and described, those skilled in the art should understand, these embodiments can be carried out various modifications without departing from the principle and spirit of the present invention, and such modifications should fall into the scope of the present invention.

The invention claimed is:

1. An unlocking method applied in an electronic apparatus that includes a first body and a second body, wherein the first body and the second body are locked by a locking mechanism, and the electronic apparatus further includes a capacitance detecting unit, the method comprising:
  detecting whether there is an unlocking operation from a first user based on the capacitance detecting unit;
  generating an unlocking instruction in response to the unlocking operation when the unlocking operation is detected;
  executing the unlocking instruction to control the locking mechanism to release a lock, so as to make the first body be able to be separated from the second body,
  when the locking mechanism includes a first connecting member positioned in the first body, a first locating hole is provided on the first connecting member; the locking mechanism further includes a lock bar provided in the second body, a variable magnetic piece, an attracting piece and an elastic piece; wherein, a first locating pin is provided on the lock bar, the lock bar is connected with the attracting piece, and the variable magnetic piece is fixed at the housing of the second body; wherein the variable magnetic piece is a resistant electromagnet, and the physical characteristic thereof is a status of loss of magnetism as power on and a magnetic status as power off,
  the executing the unlocking instruction to control the locking mechanism to release lock comprises executing the unlocking instruction to supply power to the variable magnetic piece so that the variable magnetic piece loses magnetism after power on and is no longer absorbed to engage the attracting piece, the lock bar is pulled in the action of the force of reverse drawing of the elastic piece restoring original length, the first locating pin no longer engages to join the first locating hole, thus the first body release lock with the second body and the first body is able to separate from the second body.

2. The unlocking method according to claim 1, wherein the generating an unlocking instruction in response to the unlocking operation comprises:
  obtaining a first password to be authenticated in response to the unlocking operation;
  deciding whether the first password to be authenticated matches a first standard password to obtain a first matching result;
  generating the unlocking instruction when the first matching result indicates that the match of the first password to be authenticated and the first standard password is successful.

3. The unlocking method according to claim 2, wherein after the obtaining a first matching result, the method further comprises generating and outputting prompt information to prompt the first user to carry out the unlocking operation anew when the first matching result indicates that the match between the first password to be authenticated and the first standard password is failed.

4. The unlocking method according to claim 2, wherein when the capacitance detecting unit includes at least one capacitance detecting point, the obtaining a first password to be authenticated in response to the unlocking operation comprises obtaining a first fingerprint to be authenticated in response to a first touch control unlocking operation executed by the first user to the at least one capacitance detecting point.

5. The unlocking method according to claim 2, wherein when the capacitance detecting unit includes M capacitance detecting points and M is an integer greater than or equal to 2 and, the obtaining a first password to be authenticated in response to the unlocking operation comprises obtaining a first pattern to be authenticated in response to a second touch control unlocking operation executed by the first user to the M capacitance detecting points with a first rule.

6. The unlocking method according to claim 1, wherein after generating the unlocking instruction, the method further comprises generating and sending an information synchronizing instruction to the second body to make the second body be able to send input information obtained to the first body by executing the information synchronizing instruction.

7. The unlocking method according to claim 1, wherein when there is a timing unit in the electronic apparatus, after the controlling the locking mechanism to release lock, the method further comprises:
  deciding whether the first body is in a connected status or a disconnected status with the second body;
  detecting whether a first counting time value of the timing unit is equal to a preset counting time value when the first body is in the connected status with the second body;
  generating a locking instruction when the first counting time value is equal to the preset counting time value; and,
  executing the lock instruction to control the locking mechanism to lock again.

8. An electronic apparatus comprising:
  a first body;
  a second body;
  a locking mechanism by which the first body and the second body are locked;

a capacitance detecting unit for detecting whether there is an unlocking operation from a first user and generating an unlocking instruction in response to the unlocking operation when the unlocking operation is detected;

wherein, the electronic apparatus is able to control the locking mechanism to release a lock so as to make the first body able to be separated from the second body by executing the unlocking instruction, and wherein the locking mechanism includes a first connecting member positioned in the first body, a first locating hole is provided on the first connecting member; the locking mechanism further includes a lock bar provided in the second body, a variable magnetic piece, an attracting piece and an elastic piece; wherein, a first locating pin is provided on the lock bar, the lock bar is connected with the attracting piece, and the variable magnetic piece is fixed at the housing of the second body; wherein the variable magnetic piece is a resistant electromagnet, and the physical characteristic thereof is a status of loss of magnetism as power on and a magnetic status as power off;

wherein the electronic apparatus executes the unlocking instruction to supply power to the variable magnetic piece, so that the variable magnetic piece loses magnetism after power on and is no longer absorbed to engage the attracting piece, the lock bar is pulled in the action of the force of reverse drawing of the elastic piece restoring original length, the first locating pin no longer engages to join the first locating hole, thus the first body release lock with the second body and the first body is able to separate from the second body.

9. The electronic apparatus according to claim 8, wherein the capacitance detecting unit comprises:

a capacitance detecting subunit for obtaining a first password to be authenticated in response to the unlocking operation;

a deciding subunit for deciding whether the first password to be authenticated matches a first standard password to obtain a first matching result;

a first instruction generating subunit for generating the unlocking instruction when the first matching result indicates that the match between the first password to be authenticated and the first standard password is successful.

10. The electronic apparatus according to claim 9, wherein the capacitance detecting unit comprises a prompting subunit for generating and outputting a prompt information to prompt the first user to carry out the unlocking operation anew when the first matching result indicates that the match between the first password to be authenticated and the first standard password is failed.

11. The electronic apparatus according to claim 9, wherein when the capacitance detecting unit includes at least one capacitance detecting point, the capacitance detecting subunit is configured for obtaining a first fingerprint to be authenticated in response to a first touch control unlocking operation carried out by the first user to the at least one capacitance detecting point.

12. The electronic apparatus according to claim 9, wherein when the capacitance detecting unit includes M capacitance detecting points and M is an integer greater than or equal to 2, the capacitance detecting subunit is configured for obtaining a first pattern to be authenticated in response to a second touch control unlocking operation carried out by the first user to the M capacitance detecting points with a first rule.

13. The electronic apparatus according to claim 8, wherein the electronic apparatus further comprises an information synchronizing unit for generating and sending an information synchronizing instruction to the second body to make the second body able to send input information obtained to the first body by executing the information synchronizing instruction so that the first body can process the input information.

14. The electronic apparatus according to claim 8, wherein the electronic apparatus further comprises:

a timing unit;

a deciding unit for deciding whether the first body is in a connected status or a disconnected status with the second body;

a time detecting unit for detecting whether a first counting time value of the timing unit is equal to a preset counting time value when the first body is in the connected status with the second body;

a second instruction generating unit for generating a locking instruction when the first counting time value is equal to the preset counting time value;

wherein, the electronic apparatus is able to control the locking mechanism to lock again by executing the locking instruction.

\* \* \* \* \*